(12) United States Patent
Selensky et al.

(10) Patent No.: US 11,941,834 B2
(45) Date of Patent: Mar. 26, 2024

(54) TRAILER ANGLE DETERMINATION SYSTEM FOR A VEHICLE

(71) Applicant: CONTINENTAL AUTOMOTIVE GMBH, Hannover (DE)

(72) Inventors: Denis Selensky, Frankfurt (DE); Hauke Kuban, Frankfurt am Main (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 378 days.

(21) Appl. No.: 17/008,907

(22) Filed: Sep. 1, 2020

(65) Prior Publication Data

US 2021/0019904 A1    Jan. 21, 2021

Related U.S. Application Data

(63) Continuation of application No. PCT/DE2019/200019, filed on Feb. 26, 2019.

(30) Foreign Application Priority Data

Mar. 2, 2018    (DE) ...................... 10 2018 203 152.5

(51) Int. Cl.
*G06T 7/60*    (2017.01)
*G01B 11/14*    (2006.01)
(Continued)

(52) U.S. Cl.
CPC ................ *G06T 7/60* (2013.01); *G01B 11/14* (2013.01); *G01B 11/26* (2013.01); *G06T 7/50* (2017.01);
(Continued)

(58) Field of Classification Search
USPC ......................................................... 382/104
See application file for complete search history.

(56) References Cited

U.S. PATENT DOCUMENTS

2010/0265048 A1    10/2010    Lu et al.
2014/0085472 A1*   3/2014     Lu .............................. B60R 1/00
                                                           348/148
(Continued)

FOREIGN PATENT DOCUMENTS

DE        102017120227 A1    3/2018
WO        WO-2008064892 A1 *  6/2008    ............. B62D 13/06
WO        2017123880 A1      7/2017

OTHER PUBLICATIONS

European Examination Report dated Dec. 19, 2022 from corresponding European Patent Application No. 19709622.5.
(Continued)

*Primary Examiner* — Ishrat I Sherali

(57) ABSTRACT

A trailer angle determination system for a vehicle is provided. The trailer angle determination system has a sensing unit for sensing a trailer connected to the vehicle and an evaluation unit. The sensing unit is arranged outside of the center of the vehicle and toward the trailer, and the distance between the sensing unit and the center of the vehicle is known. The trailer has symmetrical feature pairs with respect to a longitudinal axis of symmetry of the trailer. The sensing unit is designed to sense the symmetrical feature pairs of the trailer. The evaluation unit is designed to determine the angle between the trailer and the vehicle based on the sensed symmetrical feature pairs of the trailer and the known distance between the sensing unit and the center of the vehicle.

16 Claims, 3 Drawing Sheets

(51) Int. Cl.
  *G01B 11/26*  (2006.01)
  *G06T 7/50*  (2017.01)
  *G06T 7/73*  (2017.01)
  *B62D 15/02*  (2006.01)

(52) U.S. Cl.
  CPC .............. *G06T 7/73* (2017.01); *B62D 15/027* (2013.01); *G06T 2207/30252* (2013.01)

(56) References Cited

U.S. PATENT DOCUMENTS

2018/0121742 A1* 5/2018 Son .................... G01C 21/28
2018/0276838 A1* 9/2018 Gupta .................... B60R 1/00
2022/0337726 A1* 10/2022 Gali .................... B62D 13/00

OTHER PUBLICATIONS

International Search Report and Written Opinion dated May 22, 2019 from corresponding International Patent Application No. PCT/DE2019/200019.
German Search Report dated Mar. 2, 2018 for corresponding German Patent Application No. 10 2018 203 152.5.
Wikipedia, Feature (computer vision), Feb. 20, 2018, https://en.wikipedia.org/wiki/Feature_(computer_vision)#Detectors.
University of Toronto, Camera Models and Parameters, ftp.cs.toronto.edu/pub/psala/VM/camera-parameters.pdf, Jul. 20, 2006.

* cited by examiner

TRAILER ANGLE DETERMINATION SYSTEM FOR A VEHICLE

CROSS-REFERENCE TO RELATED APPLICATIONS

This application claims the benefit of PCT Application PCT/DE2019/200019, filed Feb. 26, 2019, which claims priority to German Application DE 10 2018 203 152.5, filed Mar. 2, 2018. The disclosures of the above applications are incorporated herein by reference.

TECHNICAL FIELD

The disclosure relates to a trailer angle determination system for a vehicle, a vehicle having such a trailer angle determination system, a method for determining the angle between a vehicle and a trailer, a program item and a computer-readable medium.

BACKGROUND

Driver assistance systems are increasingly being installed in modern vehicles, in order to support the driver while driving. For many drivers, driving as well as maneuvering with a trailer constitutes a challenge. In this connection, the driver can be supported by a driver assistance system. The driver can be provided with useful information regarding the correct control of the vehicle having the trailer by the driver assistance system, in particular during maneuvering. In this connection, the angle between the vehicle and the trailer can be crucial. In particular if the trailers are often exchanged, for example in the logistics sector, the angle between the trailer and the vehicle has to be determined quickly, simply and reliably by such a driver assistance system.

SUMMARY

A first aspect of the disclosure relates to a trailer angle determination system that determines the angle between a vehicle and a trailer. The trailer angle determination system has a sensing unit for sensing a trailer connected to the vehicle and an evaluation unit. The sensing unit is arranged outside of the center of the vehicle and toward the trailer, and the distance between the sensing unit and the center of the vehicle is known. The trailer has symmetrical feature pairs with respect to a longitudinal axis of symmetry of the trailer. The sensing unit is designed to sense the symmetrical feature pairs of the trailer and to identify the latter as such. The evaluation unit is designed to determine the angle between the trailer and the vehicle, for example, exclusively on the basis of the sensed symmetrical feature pairs of the trailer and the known distance between the sensing unit and the center of the vehicle.

Implementations of the disclosure may include one or more of the following optional features. In some implementations, the trailer angle determination system determines the angle between a vehicle and a trailer connected to the vehicle. To this end, a sensing unit may be arranged outside of the center of the vehicle, which senses the trailer. The trailer may additionally have symmetrical feature pairs with respect to a longitudinal axis of symmetry of the trailer. The features of the feature pairs may be corners, edges, lights, reflectors, hinges, ribbing, grooves or receptacles of the trailer, but the features may also be especially affixed patterns or objects. These symmetrical feature pairs may be evaluated by the evaluation unit in such a way that these can determine the angle between the vehicle and the trailer. Additionally, during an initialization, during which the angle between the vehicle and the trailer is 0° or respectively 180°, the distance between the vehicle and the respective feature pair of the trailer may be determined. The sensing unit can additionally determine the angle of the lines of sight, the angle between the sensing unit and the respective feature with respect to the main direction (parallel to the center of the vehicle). In other words, the sensing unit may determine the direction of the feature. This distance information can also flow into the determination of the angle between the vehicle and the trailer, in particular how the angle of the lines of sight of the respective features alters from the viewpoint of the sensing unit due to the rotation or respectively the angle between the vehicle and the trailer. The initialization of the trailer angle determination system can be performed on the basis of an image or respectively a frame so that protracted training or the use of special markings can be dispensed with. As a result, the trailer angle determination system described above and below can be quickly adapted to a new trailer. Consequently, the flexibility of the system can be increased.

The determination system described above and below allows for the trailers to be quickly changed, without a protracted learning process being required.

The determined angle between the vehicle and the trailer can be used for controlling a vehicle having a trailer, for example during maneuvering. Alternatively or additionally, depending on the angle, the driver of the vehicle can be given an indication of the correct control of the vehicle having the trailer. The correct control of a vehicle and trailer can play a part, for example, during maneuvering of the vehicle and trailer.

Alternatively or additionally, as well as the trailer, the angle between a further vehicle, a travel trailer, a horse transporter or a boat trailer and the ego vehicle (i.e., current vehicle) can also be determined. In other words, the trailer can also be a further vehicle, for example, if the latter is towed.

It should be noted that the center of the vehicle means the longitudinal axis of the vehicle which can, likewise, be a longitudinal axis of symmetry. The center of the vehicle can serve as a reference if the trailer coupling is located centrally on the vehicle. It should additionally be noted that, in general, the sensing unit is deliberately arranged outside of the longitudinal axis of the trailer coupling. Consequently, it does not absolutely have to be the center of the vehicle, but the sensing unit can be arranged outside of the longitudinal axis of symmetry of the trailer if the angle between the trailer and the vehicle is 0° or respectively 180°.

In some implementations, the sensing unit is a mono-camera which senses image data of the trailer.

The sensing unit may include a camera which performs an initialization based on an image. A stereo-camera or further sensors are not necessary for this disclosure. The image data of the trailer can have symmetrical features of the trailer so that a secure establishment of the angle between the vehicle and the trailer is possible.

In some examples, the evaluation unit is designed to determine at least two feature pairs which are symmetrical to the longitudinal axis of symmetry of the trailer in the image data of the sensing unit and to determine the angle between the trailer and the vehicle on the basis of the sensed feature pairs.

For a reliable determination of the angle between the vehicle and the trailer, the evaluation unit can sense or respectively determine at least two symmetrical feature pairs with respect to the longitudinal axis of symmetry of the trailer. Due to the respective change in the angle of the lines of sight of the sensing unit, that is to say at what angle the respective feature of the feature pair has been sensed by the sensing unit, the evaluation unit can determine the angle between the vehicle and the trailer. In other words, the evaluation unit can determine how much the trailer has rotated with respect to the vehicle. Alternatively or additionally, the center of rotation, e.g. the trailer coupling and the distance thereof from the vehicle, can be known to the evaluation unit. As a result, the determination of the angle between the vehicle and the trailer can be simplified since the center of rotation is known. Additionally, the distance between the center of rotation (e.g. a trailer coupling) and the vehicle can be determined, for a start, by the trailer angle determination system, since this distance does not change for a determined vehicle.

To this end, the change in the angle of the respective line of sight of the individual features of the at least two feature pairs can be utilized. When an initialization is performed, the distance between the feature and the sensing unit can be determined at an angle of 0° or respectively 180°.

In some implementations, the evaluation unit is designed to determine the distance between the trailer and vehicle on the basis of the distance between the sensing unit and the center of the vehicle and the positions of the at least two symmetrical feature pairs of the trailer in the image data.

The distance between the vehicle and the trailer may be determined based on the recognized feature pairs and the known distance between the sensing unit and the center of the vehicle if the center of the vehicle and the longitudinal axis of symmetry of the trailer are located in a line, in other words, if the angle between the vehicle and the trailer is 0° or respectively 180°.

In some implementations, the distance between the vehicle and the trailer is calculated according to this formula:

$$x = \frac{2y_c}{\tan \alpha_r - \tan \alpha_l}$$

where x is the distance between the vehicle and the trailer, $y_c$ is the distance between the sensing unit and the center of the vehicle, and $\alpha_r$ and $\alpha_l$ are the angles of the features of the feature pair with regard to the main visual axis of the sensing unit.

The above formula may be derived by conversion and by various assumptions. The distance between the two symmetrical features of a feature pair with respect to the longitudinal axis of symmetry of the trailer can be equal, for example $y_r$ and $y_l$, where the distance $y_l$ can be between the features of the feature pair, from which it follows that $0.5*y_l$ is equal to $y_r$ and $y_l$. Additionally, two right triangles may be defined, where the first right triangle includes the first feature of the feature pair and the second right triangle includes the second feature of the feature pair. Due to the arrangement of the sensing unit at a known distance $y_c$ from the center of the vehicle, the length of the opposite side of the first right triangle may be described as $y_l+y_c$ or respectively as $0.5*y_l+y_c$ and the length of the opposite side of the second right triangle may be described as $y_r-y_c$ or respectively as $0.5*y_l-y_c$. The length of the adjacent side of the first right triangle and the length of the adjacent side of the second right triangle are identical and correspond to the distance x between the vehicle and the feature of the trailer.

The angle of the line of sight between the sensing unit and the respective feature may be designated $\alpha_r$ or respectively $\alpha_l$ and the angles can be determined directly by the sensing unit. $0.5*y_l+y_c$ additionally equals $x*\tan(\alpha_l)$ and $0.5*y_l-y_c$ equals $x*\tan(\alpha_r)$. Moreover, due to the symmetry of the features, $0.5*y_l$ equals $x*\tan(\alpha_l)-y_c$ and simultaneously equals $x*\tan(\alpha_r)+y_c$. Consequently, these two formulas can be equated to $0.5*y_l$ and solved for x in such a way that $$x = \frac{2y_c}{\tan \alpha_r - \tan \alpha_l}$$

applies. Consequently, the distance x between the vehicle and the trailer can be determined depending on the known distance $y_c$ between the sensing unit and the center of the vehicle and the known angles $\alpha_r$ and $\alpha_l$, at which the first feature pair has been sensed by the sensing unit.

In some implementations, the evaluation unit is designed to determine the distance between the vehicle and the trailer by an initialization based on an image, in which the center of the vehicle and the longitudinal axis of symmetry of the trailer are in a line.

During the initialization of the trailer angle determination system, the distance between the vehicle and the trailer or respectively the features of the feature pairs of the trailer can be determined; the distance can serve as a starting point for the later determination of the angle between the vehicle and the trailer. The distance can be determined if the longitudinal axis of symmetry of the trailer is equal to the center of the vehicle, since then the distance between the two features of the feature pair and the vehicle is the same. In other words, the initialization can be performed if the angle between the vehicle and the trailer is 0° or respectively 180°.

A further aspect of the disclosure relates to a vehicle having a trailer angle determination system which is described above and below.

The vehicle is, for example, a motor vehicle such as a car, a bus or a truck.

A further aspect of the disclosure relates to a method for determining the angle between a vehicle and a trailer connected to the vehicle. The method has the following steps: sensing of the trailer by a sensing unit which is arranged outside of the center of the vehicle toward the trailer; determining of the distance between the sensing unit and a center of the vehicle; and sensing of symmetrical feature with respect to the longitudinal axis of symmetry of the trailer. The method also has the following steps determining of the distance between the vehicle and the trailer if the longitudinal axis of symmetry of the trailer and the center of the vehicle are in a line; and determining of the angle between the vehicle and the trailer on the basis of the symmetrical features of the trailer and the known distance between the sensing unit and the center of the vehicle.

It should be noted that the steps of the method can also be executed in a different order or can be executed simultaneously. There can additionally be a longer time span between individual steps.

A further aspect of the disclosure relates to a program item which, if it is executed on an evaluation unit of a trailer angle determination system, instructs the evaluation unit to perform the method described above and below.

A further aspect of the disclosure relates to a computer-readable medium, on which a program item is stored, which, if it is executed on an evaluation unit of a trailer angle determination system, instructs the evaluation unit to perform the method described above and below.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
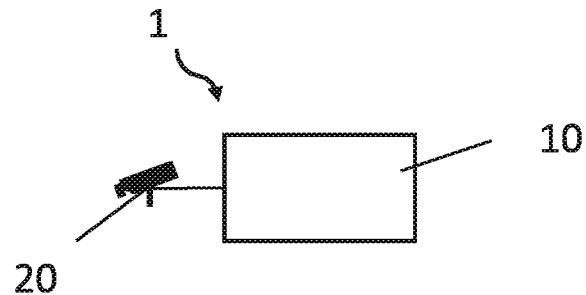
FIG. 1 shows a block diagram of an exemplary trailer angle determination system.

FIG. 1 shows a block diagram of a trailer angle determination system 1. The trailer angle determination system 1 has a sensing unit 20 and an evaluation unit 10. The sensing unit 20 is configured to sense image data of a trailer which is connected to the vehicle of the trailer angle determination system 1. Moreover, the trailer has symmetrical feature pairs with respect to a longitudinal axis of symmetry of the trailer. The sensing unit 20 is additionally arranged outside of the center of the vehicle and has a parallel alignment with respect to the center of the vehicle. The evaluation unit 10 can determine the angle between the vehicle and the trailer on the basis of the sensed image data of the sensing unit 20 and the known distance between the sensing unit 20 and the center of the vehicle. The sensing unit 20 can additionally determine the angle, along the line of sight of the sensing unit 20, at which angle an object or respectively a feature is located with respect to the sensing unit. For the calibration, the trailer angle determination system 1 merely needs an image or respectively a frame of the sensing unit 20, in the case of which the center of the vehicle and the longitudinal axis of symmetry of the trailer are in a line. As a result, the distance between the vehicle and the trailer or respectively the features of the feature pair of the trailer can be determined.

Figure 2:
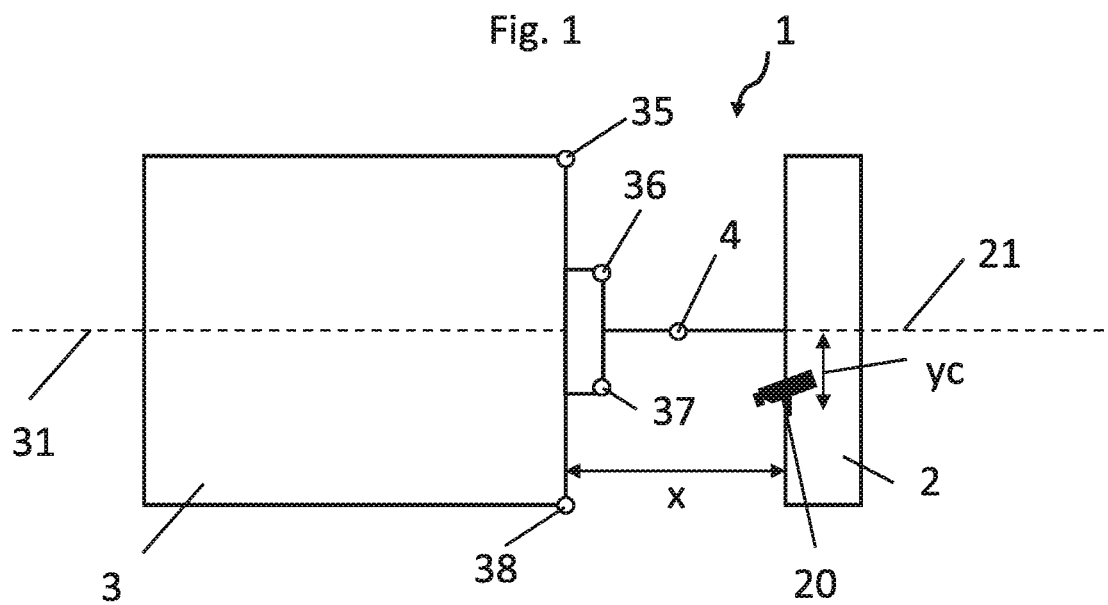
FIG. 2 shows a schematic depiction of a vehicle having an exemplary trailer angle determination system and a trailer.

FIG. 2 shows a schematic depiction of the trailer angle determination system on a vehicle 2. To this end, a sensing unit 20, e.g. a camera, is arranged on the vehicle 2. The vehicle 2 has a center 21 (longitudinal axis of the vehicle) (depicted as a dashed line). The sensing unit is deliberately arranged outside of said center 21 of the vehicle 2 in the distance $y_c$. A trailer 3 is additionally connected to the vehicle via a rotatable coupling 4. The trailer likewise has a longitudinal axis of symmetry 31 (depicted as a dashed line). The distance between the vehicle and the trailer is designated x. The trailer 3 has symmetrical features 35, 36, 37, 38 with respect to its longitudinal axis of symmetry 31. These features 35, 36, 37, 38 are, in each case, used in pairs 35, 38; 36, 37 in order to determine the angle between the vehicle 2 and the trailer 3. Moreover, the sensing unit 20 can sense the symmetrical features 35, 36, 37, 38 of the trailer 3 and the evaluation unit can evaluate these in such a way that the angle between the vehicle 2 and the trailer 3 can be determined. The angle is, in this connection, the angle between the longitudinal axis or respectively the center 21 of the vehicle 2 and the longitudinal axis of symmetry 31 of the trailer 3.

Figure 3:
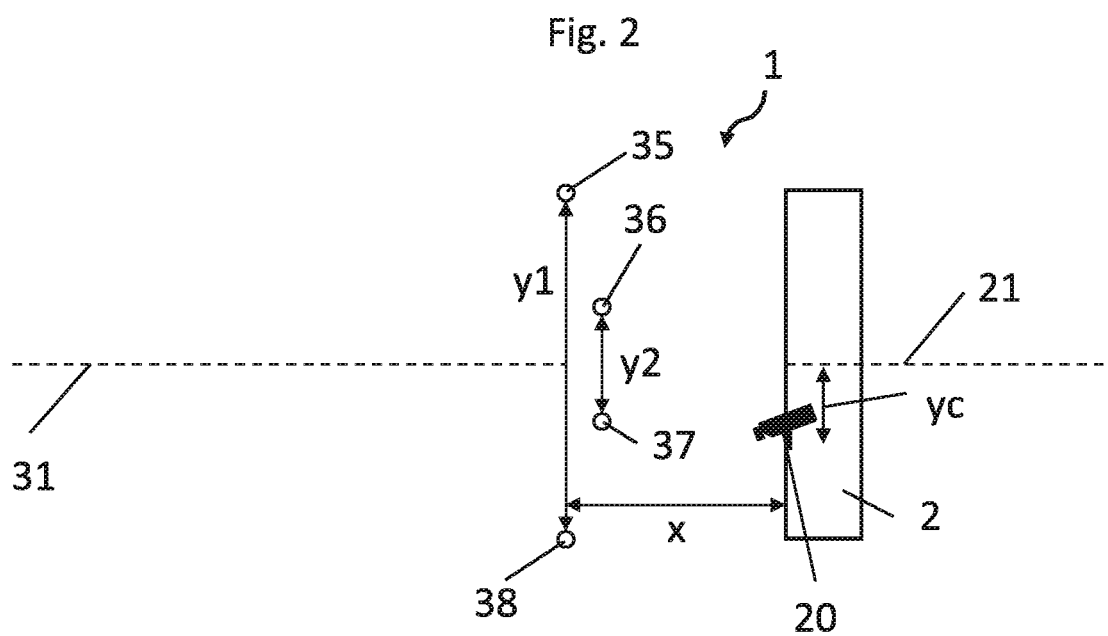
FIG. 3 shows a schematic depiction of the features of the trailer recognized by the exemplary trailer angle determination system.

FIG. 3 likewise shows a schematic depiction of the trailer angle determination system. Unlike FIG. 2, the trailer and the coupling between the trailer and the vehicle 2 have been removed for reasons of clarity. Moreover, the distance $y_1$ between the first feature pair 35, 38 and the distance $y_2$ between the second feature pair 36, 37 are depicted. In this connection, it should be pointed out that the distance between the longitudinal axis of symmetry 31 of the trailer and the features of the first feature pair 35, 38 is the same and is $0.5*y_1$. The distance between the longitudinal axis of symmetry 31 of the trailer and the features of the second feature pair 36, 37 is additionally the same and is $0.5*y_2$.

Figure 4:
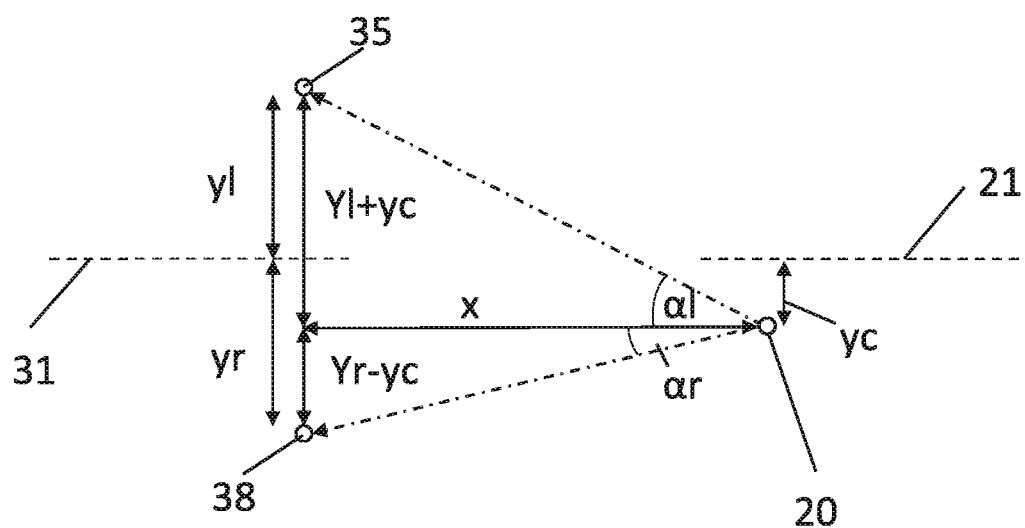
FIG. 4 shows a schematic depiction of the exemplary calculation of the distance between the vehicle and the trailer.

FIG. 4 shows a schematic view of the determination of the distance between the vehicle and the trailer if the center 21 of the vehicle and the longitudinal axis of symmetry 31 of the trailer are the same. To this end, an image or respectively a frame having symmetrical feature pairs of the trailer is needed in this case. The sensing unit 20 is, in this connection, deliberately arranged outside of the center 21 of the vehicle, and the distance $y_c$ between the center 21 of the vehicle and the sensing unit 20 is known. Moreover, the angle αl, αr is known by the sensing unit 20, at which the image data of the respective symmetrical features of the feature pair are received. The sensing unit 20 senses at least one symmetrical feature pair 35, 38 of the trailer. In this connection, the distance $y_l$, $y_r$ between the respective feature 35, 38 and the longitudinal axis of symmetry 31 of the trailer is identical and corresponds in each case to $0.5*y_1$. Two right triangles can now be formed from the viewpoint of the sensing unit 20. The first right triangle includes the first feature 35 of the first feature pair 35, 38 and the distance x between the vehicle and the trailer and the second right triangle includes the second feature 38 of the first feature pair 35, 38 and the distance x. Due to the arrangement of the sensing unit 20 at a distance $y_c$ from the center 21 of the vehicle, the length of the opposite side of the first right triangle can be described as $y_l+y_c$ or respectively as $0.5*y_l+y_c$ and the length of the opposite side of the second right triangle can be described as $y_r-y_c$ or respectively as $0.5*y_l-y_c$. The length of the adjacent side of the first right triangle and the length of the adjacent side of the second right triangle are identical and correspond to the distance x between the vehicle and the trailer. Additionally, $0.5*y_l+y_c$ equals $x*\tan(\alpha_l)$ and $0.5*y_l-y_c$ equals $x*\tan(\alpha_r)$. It is also true that, due to the symmetry of the features 35, 38, $0.5*y_l$ is equal to $x*\tan(\alpha_l)-y_c$ and is simultaneously equal to $x*\tan(\alpha_r)+y_c$. Consequently, these two formulas can be equated to $0.5*y_l$ and solved for x in such a way that $$x = \frac{2y_c}{\tan \alpha_r - \tan \alpha_l}$$

applies. Consequently, the distance x between the vehicle and the trailer can be determined depending on the known distance $y_c$ between the sensing unit and the longitudinal axis of symmetry of the trailer and the known angles, at which the first feature pair 35, 38 has been sensed by the sensing unit 20.

Figure 5:
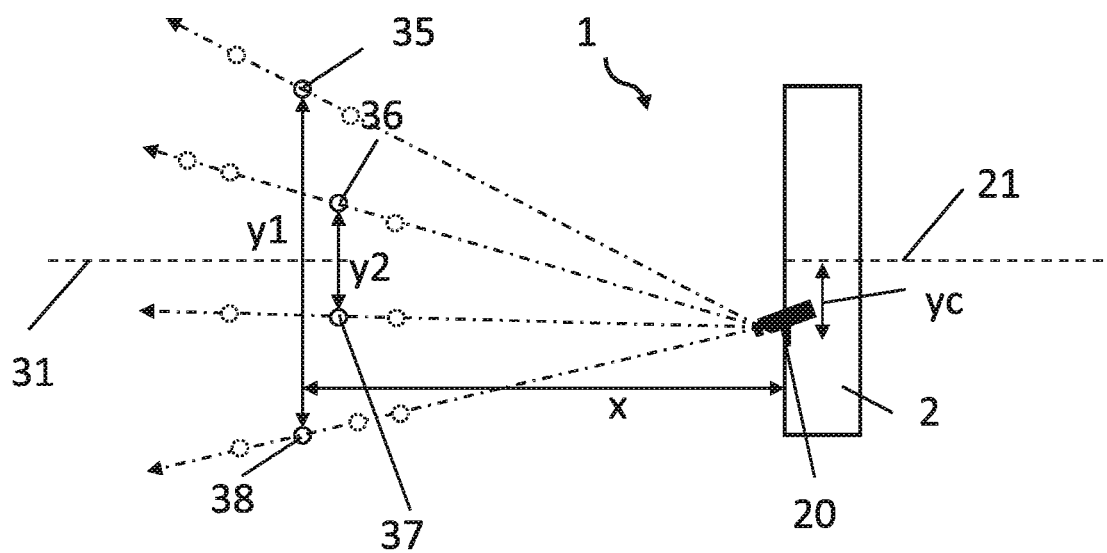
FIG. 5 shows a schematic depiction of the possible positions of the features of the trailer from the viewpoint of the exemplary trailer angle determination system.

FIG. 5 shows a schematic depiction of the correct distance determination of the individual feature pairs 35, 38; 36, 37. In this connection, the dotted circles symbolize the possible positions of the features from the viewpoint of the sensing unit 20 along the lines of sight of the sensing unit 20. These can be located at any position along the line of sight (dashed arrow starting from the sensing unit 20). The solid circles symbolize the actual positions of the features 35, 36, 37, 38 of the trailer 3. The actual position of the respective feature pairs 35, 38; 36, 37 can be determined by the method which has been described with reference to FIG. 4. The angle between the vehicle 2 and the trailer 3 can be subsequently determined during the operation of the trailer angle determination system with the determined positions of the symmetrical feature pairs 35, 38; 36, 37 during the initialization.

Figure 6:
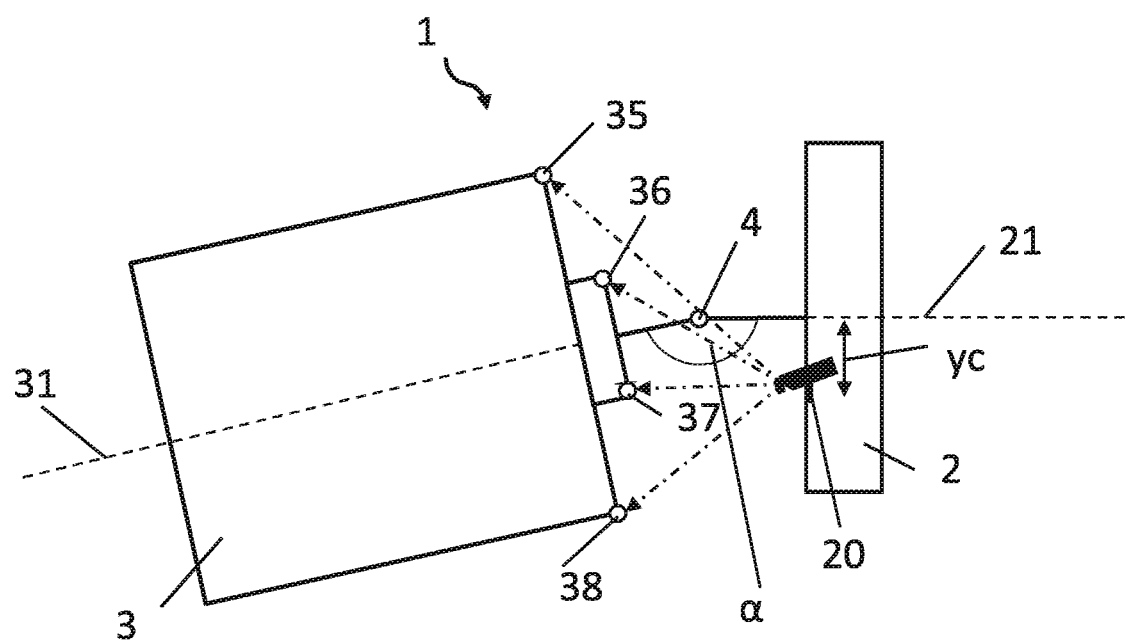
FIG. 6 shows the exemplary trailer angle determination system which has determined the angle between the vehicle and the trailer.

FIG. 6 shows the trailer angle determination system during operation. Here, the angle α between the vehicle 2 and the trailer 3 is not equal to 0° or respectively 180°, where the trailer 3 has rotated around the coupling 4. The symmetrical feature pairs 35, 38; 36, 37 change, due to the rotation, the angle of the line of sight between the respective feature 35, 36, 37, 38 and the sensing unit 20. Due to the change in the angle of the line of sight of the at least two symmetrical feature pairs 35, 38; 36, 37 and the previously known distance x between the vehicle 2 and the trailer 3, the angle α between the vehicle 2 and the trailer 3 can be extrapolated by the evaluation unit. In a further example, the position of the coupling 4 and, consequently, of the center of rotation can additionally be known, as a result of which the calculation of the angle α between the vehicle 2 and the trailer 3 can be simplified.

Figure 7:
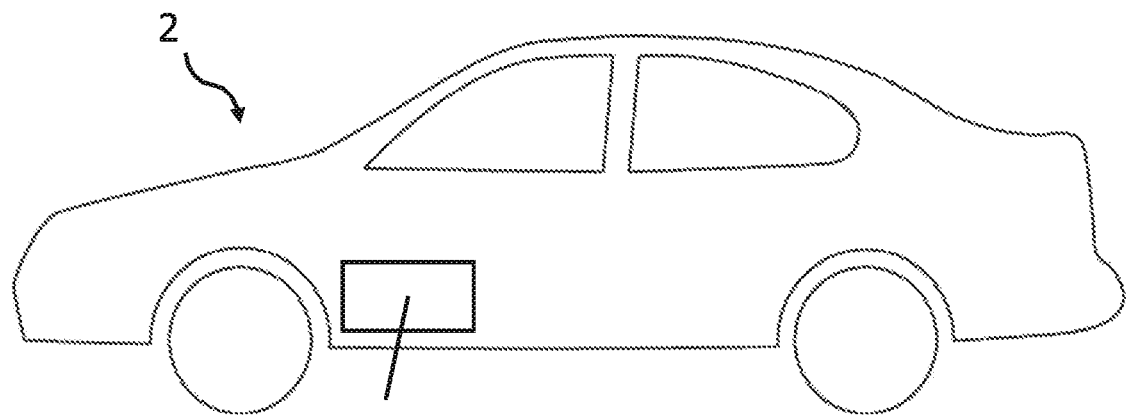
FIG. 7 shows a vehicle having an exemplary trailer angle determination system.

FIG. 7 shows a vehicle 2 having a trailer angle determination system 1 which is described above and below.

Figure 8:
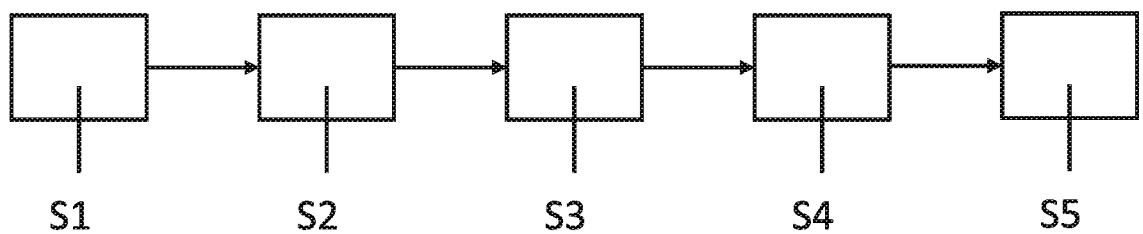
FIG. 8 shows a flow chart for an exemplary method for determining an angle between a vehicle and a trailer.

FIG. 8 shows a flow chart for a method for determining the angle between a vehicle and a trailer connected to the vehicle. In step S1, the trailer is sensed by the sensing unit, the sensing unit is, in this connection, arranged outside of the center toward the trailer. In step 2, the distance between the sensing unit and the center of the vehicle is determined. In step S3, symmetrical features of the trailer are sensed by the evaluation unit with respect to the longitudinal axis of symmetry of the trailer. In step S4, the distance between the vehicle and the trailer is determined if the center of the vehicle and the longitudinal axis of symmetry of the trailer are in a line. In step 5, the angle between the vehicle and the trailer is determined on the basis of the symmetrical features of the trailer and the known distance between the sensing unit and the center of the vehicle, as well as the determined distance between the vehicle and the trailer.

A number of implementations have been described. Nevertheless, it will be understood that various modifications may be made without departing from the spirit and scope of the disclosure. Accordingly, other implementations are within the scope of the following claims.

What is claimed is:

1. A trailer angle determination system for a vehicle, the system comprising:
a sensing unit comprising a camera, the sensing unit sensing a trailer connected to the vehicle; and
an evaluation unit having a first input connected to an output of the camera and a second input connected to a computer-readable medium on which a program is stored, the evaluation unit executing the program,
wherein the sensing unit is arranged outside of a center of the vehicle and toward the trailer, and wherein a distance between the sensing unit and the center of the vehicle is known,
wherein the trailer has symmetrical feature pairs with respect to a longitudinal axis of symmetry of the trailer,
wherein the sensing unit is designed to sense the symmetrical feature pairs of the trailer,
wherein the evaluation unit is configured by the program to determine the angle between the trailer and the vehicle on the basis of the sensed symmetrical feature pairs of the trailer and the known distance between the sensing unit and the center of the vehicle,
wherein the sensing unit senses image data of the trailer, and the evaluation unit is configured by the program to determine the distance between the trailer and the vehicle on the basis of the distance between the sensing unit and the center of the vehicle and the positions of the symmetrical feature pairs of the trailer in the image data.

2. The trailer angel determination system according to claim 1, wherein the determined angle is used by a driver assistance system of the vehicle.

3. The trailer angle determination system according to claim 1, wherein the sensing unit is a mono-camera.

4. The trailer angle determination system according to claim 3, wherein the evaluation unit is configured by the program to evaluate the symmetrical feature pairs which are symmetrical to the longitudinal axis of symmetry of the trailer in the image data and to determine the angle between the trailer and the vehicle on the basis of the symmetrical feature pairs.

5. The trailer angle determination system according to claim 1, wherein the distance between the vehicle and the trailer is calculated according to this formula:

$$x = \frac{2y_c}{\tan \alpha_r - \tan \alpha_l}$$

wherein x is the distance between the vehicle and the trailer, $y_c$ is the distance between the sensing unit and the center of the vehicle, and $\alpha_r$ and $\alpha_l$ are the angles of the features of a first symmetrical pair of the symmetrical feature pairs with respect to the main visual axis of the sensing unit.

6. The trailer angle determination system according to claim 1, wherein the evaluation unit is configured by the program to determine the distance between the vehicle and the trailer by an initialization on the basis of a single image, in which the center of the vehicle and the longitudinal axis of symmetry of the trailer are in a line.

7. A vehicle having a trailer angle determination system, the trailer angle determination system comprising:
a sensing unit including a camera and sensing a trailer connected to the vehicle; and
an evaluation unit having a first input connected to an output of the camera, and a second input connected to an output of a computer-readable medium on which a program is stored, the evaluation unit executing the program,
wherein the sensing unit is arranged outside of a center of the vehicle and toward the trailer, and wherein the distance between the sensing unit and the center of the vehicle is known, wherein the trailer has symmetrical feature pairs with respect to a longitudinal axis of symmetry of the trailer, wherein the sensing unit is designed to sense the symmetrical feature pairs of the trailer, wherein the evaluation unit is configured by the program to determine the angle between the trailer and the vehicle on the basis of the sensed symmetrical feature pairs of the trailer and the known distance between the sensing unit and the center of the vehicle, wherein the sensing unit senses image data of the trailer, and the evaluation unit is configured by the program to determine the distance between the trailer and the vehicle on the basis of the distance between the sensing unit and the center of the vehicle and the positions of the sensed symmetrical feature pairs of the trailer in the image data.

8. The vehicle according to claim 7, wherein the sensing unit is a mono-camera.

9. The vehicle according to claim 8, wherein the evaluation unit is configured by the program to evaluate at least two symmetrical feature pairs which are symmetrical to the longitudinal axis of symmetry of the trailer in the image data and to determine the angle between the trailer and the vehicle on the basis of the sensed symmetrical feature pairs.

10. The vehicle according to claim 7, wherein the distance between the vehicle and the trailer is calculated according to this formula:

$$x = \frac{2y_c}{\tan \alpha_r - \tan \alpha_l}$$

wherein x is the distance between the vehicle and the trailer, $y_c$ is the distance between the sensing unit and the center of the vehicle, and $\alpha_r$ and $\alpha_l$ are the angles of the features of a first symmetrical feature pair of the symmetrical feature pairs with respect to the main visual axis of the sensing unit.

11. The vehicle according to claim 7, wherein the evaluation unit is configured by the program to determine the distance between the vehicle and the trailer by an initialization on the basis of a single image, in which the center of the vehicle and the longitudinal axis of symmetry of the trailer are in a line.

12. A method for determining an angle between a vehicle and a trailer connected to the vehicle, having the following steps:

sensing the trailer by a sensing unit including a camera which is arranged outside of a center of the vehicle toward the trailer;

determining, by an evaluation unit having a first input connected to an output of the camera and a second input connected to an output of a computer-readable medium on which a program is stored, a distance between the sensing unit and the center of the vehicle by an evaluation unit;

sensing, by the evaluation unit, symmetrical feature pairs of the trailer with respect to a longitudinal axis of symmetry of the trailer;

determining, by the evaluation unit, a distance between the vehicle and the trailer if the longitudinal axis of symmetry of the trailer and the center of the vehicle are in a line; and determining, by the evaluation unit, the angle between the vehicle and the trailer on the basis of the symmetrical feature pairs of the trailer and the determined distance between the sensing unit and the center of the vehicle for use by a driver assistance system of the vehicle, wherein the sensing unit senses image data of the trailer, and the evaluation unit is configured by the program to determine the distance between the trailer and the vehicle on the basis of the distance between the sensing unit and the center of the vehicle and the positions of the sensed symmetrical feature pairs of the trailer in the image data.

13. A program item stored on a non-transitory computer-readable medium which, if the program is executed by an evaluation unit of a trailer angle determination system, instructs the evaluation unit to perform the method according to claim 12.

14. A non-transitory computer-readable medium, on which a program item is stored according to claim 10.

15. The method according to claim 12, wherein the distance between the vehicle and the trailer is calculated according to this formula:

$$x = \frac{2y_c}{\tan \alpha_r - \tan \alpha_l}$$

wherein x is the distance between the vehicle and the trailer, $y_c$ is the distance between the sensing unit and the center of the vehicle, and $\alpha_r$ and $\alpha_l$ are the angles of the features of a first symmetrical pair of the symmetrical feature pairs with respect to the main visual axis of the sensing unit.

16. The method according to claim 12, wherein the evaluation unit is configured by the program to determine the distance between the vehicle and the trailer by an initialization on the basis of a single image, in which the center of the vehicle and the longitudinal axis of symmetry of the trailer are in a line.

\* \* \* \* \*